United States Patent [19]

Versteege

[11] 4,166,412
[45] Sep. 4, 1979

[54] APPARATUS FOR MANUFACTURING PLASTIC BAGS WITH CONNECTION NIPPLES

[76] Inventor: Arnoldus J. Versteege, Blvd. Paulus Loot 77, Zandvoort, Netherlands

[21] Appl. No.: 699,447

[22] Filed: Jun. 24, 1976

[30] Foreign Application Priority Data

Jul. 14, 1975 [NL] Netherlands ........................ 7508410

[51] Int. Cl.² .............................................. B31B 1/84
[52] U.S. Cl. .................................. 93/8 VB; 93/33 H; 156/514
[58] Field of Search ................. 93/8 VB, 8 WA, 8 R, 93/35 R, 33 H, DIG. 1; 156/513, 514, 515, 583

[56] References Cited

U.S. PATENT DOCUMENTS

| | | | |
|---|---|---|---|
| 3,215,048 | 11/1965 | Torchio in Gattrugeri | 93/8 VB |
| 3,244,576 | 4/1966 | Swartz | 93/8 VB X |

*Primary Examiner*—James F. Coan

[57] ABSTRACT

A method is disclosed for the continuous manufacture under sterile or at least non-pyrogenous conditions of plastic bags provided with connecting nipples to be used for the storage of blood plasma or serum, milk and other vulnerable liquids.

For the welding of connecting nipples to the outer wall of the bag a counter-electrode is employed and is inserted into the bag's interior. Normally the plastic bags are formed out of an extruded plastic tube after it has been flattened and coiled to a spool.

The present method starts from a wider flat tube than that used in the prior art and which has a width equal to the length dimension of the bag to be made so the bag is open at its sides. A counter electrode formed as a sliding-block is located in the interior of the tube whose leading end is closed now. The sliding-block is displaced in a direction towards the spool and each time that the welding of the connecting nipples onto a given bag is completed, the sliding-block is passed to the next bag to be treated. The bag just treated is then closed along its sides so that sterile conditions can be maintained. Piercing through said wall portion of the bag can be deferred till the bag is actually taken in use. However, piercing can also be done during manufacture by means of a sharp-pointed needle or plunger being slidable in a bore within the sliding-block. The nipple can have virtually any shape. The most simple form is a length of narrow hose which is to be shut off by a clip. In another form the nipple is of the flange type with the flange serving as a seat for a droplet counter, for instance.

34 Claims, 14 Drawing Figures

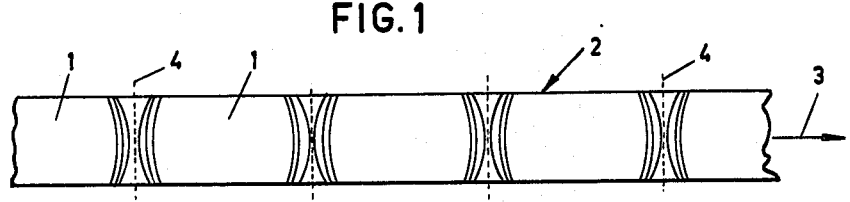
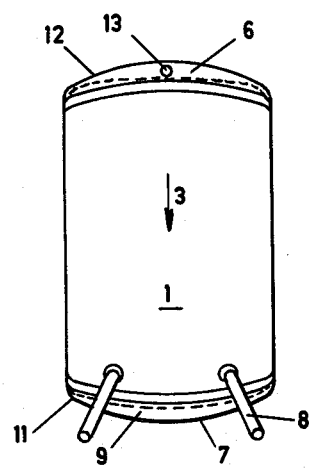 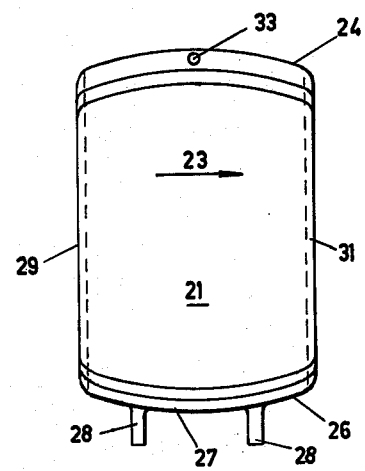
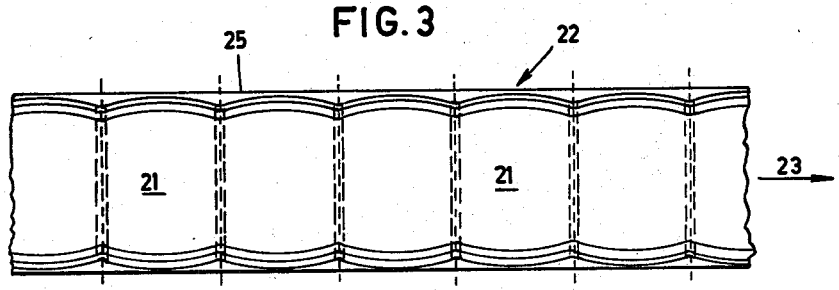
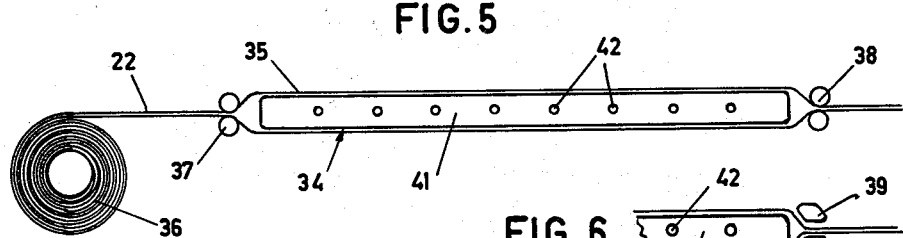
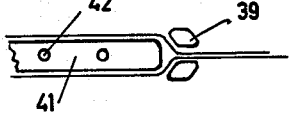

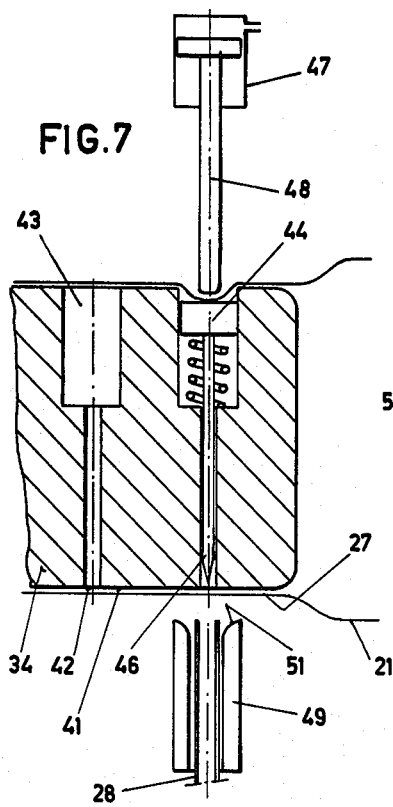
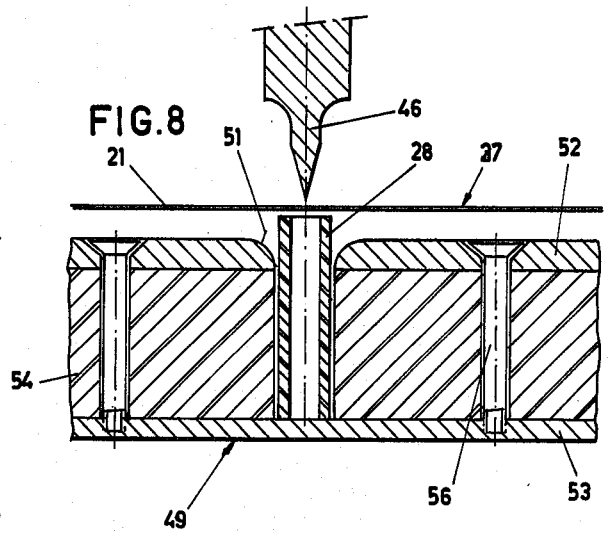
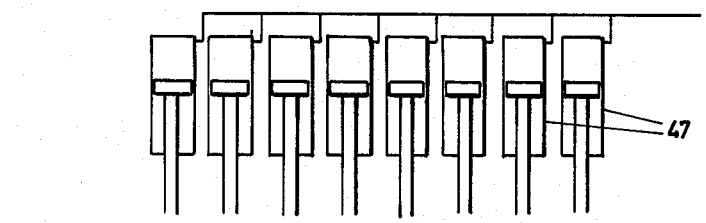
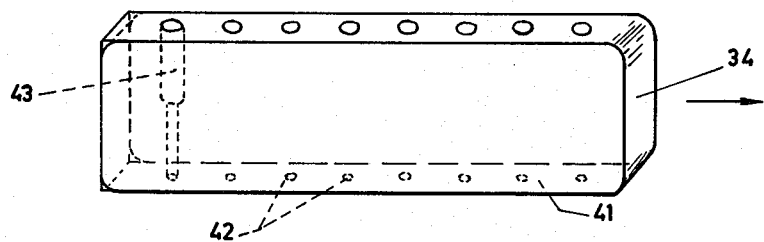

APPARATUS FOR MANUFACTURING PLASTIC BAGS WITH CONNECTION NIPPLES

This invention relates to a method and apparatus for the continuous and non-pyrogenous manufacture of plastic bags provided with connection nipples as well as the article produced thereby.

A frequently used material for the manufacture of lightweight, transparant bags for transfusion and infusion purposes, is polyvinylchloride that emanates from the extruder as a relatively small tube and which is then wound in a flat condition into a coil. Alternatively, two sheets of plastic foil have been used.

In the prior art method the flat tube was uncoiled and cut into pieces of equal length along transverse cutting lines at the leading and trailing end of each piece as viewed in the extrusion direction of the flat tube. The uncoiled and cut pieces were provided, through several operations, with various connecting nipples and with an end weld and a sealing weld at their leading end.

Prior to the provision of the connecting nipples in the cut tube piece, a mandrel or core pin had to be inserted through the open trailing end, which eventually constitutes the upper end of the bag. The nipples were applied near the closed leading end, which eventually constitutes the lower end of the bag. Then the core was withdrawn and this had to be done through the open upper end. The movement of the core was therefore a reciprocal one. Only when short nipples or narrow hose ends were to be welded could the welding operation take place from the exterior. Thereafter a sealing weld and an end weld were applied at the upper end of the bag. Due to the presence of a closing seam on the lower end of the bag the nipples could never be arranged at the lowermost end, viz. the middle region of the bottom of the bag and therefore could not point entirely perpendicularly downwards but instead, extend somewhat sideways from the bag in an inclined position.

Other disadvantages of the known method relate to the necessity of splitting open the walls of the tube piece for the insertion of the core pins and for the welding of the connecting nipples or hose ends. This opening action was very difficult due to the strong adherence of the two walls of the extruded tube being in flat, folded condition when coiled on a spool. In addition there was a need, in the prior art for the subsequent treatment of purifying and sterilizing each bag through rather expensive after-controls. The purification includes rinsing the bag with a desinfecting liquid. This involves many decades of liters of rinsing liquid, rendering said rinsing operation time consuming.

In the past it has been proposed to start from a wider extruded tube, which in a flat, folded condition can have such a width that the bag can be taken and made out of the transverse dimension of the tube. Thus, with respect to the previous method the tube material, when viewed in the extruded direction, is turned 90°. The upper and lower end weld then fall in the two original side folds of the tube. As in the previous method the leading end, forming one of the bag sides, was sealed and the trailing end left open. It was usual that during further processing of this wide tube one of its side folds was cut open to facilitate the access to the interior of the bags for the insertion and manipulation of the core pins to and from the welding areas, where the nipples were affixed. It is clear that, utilizing the prior art method, a non-pyrogenous production is impossible.

In the present method the latter process is followed but without it being necessary to cut open a side fold.

The present method is characterized in that starting from a flat, folded extruded tube, in which is inserted a relatively displaceable sliding-block, the leading end of the tube is closed and the connecting nipples are affixed on the wall of the bag by thermal or high frequency welding. The sliding-block cooperates as low electrode, with an upper electrode and, after having moved the sliding-block, upper and lower end welds along the side folds and sealing welds and cutting lines along the transverse sides are provided. The sliding-block is a core of, for example, rectangular shape which, by means of a roller mechanism or smooth sliders is retained such that the tube can be moved with respect to the core. Because of the shape of the core, the tube assumes a rectangular shape, so that the core can be used for welding operations and can serve as a carrier, if any of the core pins are movable in the interior of the tube. While it is, in principle, possible with such a rectangular sliding-block to use any of the six sides faces as a supporting face and simultaneously as lower electrode for the welding of connecting nipples, the side face engaging the definite bottom of the bag will be employed most frequently as the supporting face. For the welding operation it is therefore no longer necessary to cut the tube piece open beforehand. On the contrary, since it is not necessary to insert a core each time and to withdraw it thereafter, the leading end of the flat tube to be uncoiled can be closed and if the core has initially been introduced in a sterile manner, the sterile conditions can be maintained, although not sterile in an absolute sense but at least non-pyrogenous during the welding of the connecting nipples, and during the welding of the end welds and sealing welds along the four sides, in which of course the core has beforehand been pushed backwards in a direction opposite to the conveying direction of the tube. All connecting nipples are still closed so that the sterility resp. pyrogen freedom is maintained until the moment that the bag is put into use and is filled in a sterile manner with sterile liquids, such as blood plasma, physiological solutions and similar infusion liquids, with mild or other liquid diary products or in general with substances for which a pure or chemically pure package is very important. In this connection as a further application of the invention the packaging of pain or similar liquids in these bags can be considered. The connecting nipples can be used both for filling and for tapping purposes.

The connecting nipples themselves can also be welded on in a sterile condition. When, according to the present invention, the connecting nipples are taken off from an extruded, endless narrow hose in the form of hose pieces of arbitrary length, of which the trailing end is cut by means of a high frequency or thermal cut-welding. Each time a certain length of hose is cut off the next piece is fused so that the non-pyrogenous conditions are maintained continuously.

If the shape of the connecting nipple does not lend itself to being taken off from an endless hose, the nipples should be made separately. With the machine according to the present invention a number of nipples can be welded simultaneously to a number of bags.

It is possible to utilize the present invention such that the hose end is cut off only shortly before the welding-on operation when it is pressed on the welding-core, so that contact with the non-sterile atmosphere is very short. Alternatively, the wall of the bag is kept intact till the bag is definitely taken in use. With long hose ends this is of course not possible and so the first manner has to be chosen. That means pincing through just before the welding-on operation. There are various ways to convey the core within the interior of the tube such as by gravity, by means of vertical rollers, by means of horizontal rollers and by means of a core being coated wholly or partly with low friction material, such as teflon to keep the friction as low as possible.

The invention also relates to a sliding block fulfilling the above requirements and those to be explained herebelow.

When pulling-through the tube, the external rollers or sliders and the core remain in place so that periodically the tube is drawn over the core, irrespective of whether the core is in a horizontal or a vertical position. When the core contains magnets, it can be conveyed by external magnets, or kept in place while the tube is being displaced.

In the core block, provision can be made to establish a movement, so that a plunger can be moved mechanically or magnetically within the core block. The plunger then pierces the part of the bag wall that remains as a membrane, if it was after the welding-on of a connecting nipple. Advantageously a number of core pins, designed for different bags, can be actuated simultaneously by a pressure exerted from the exterior on the opposite end of the pin(s).

Provision is also made for welding of tube connectins or needle connectors extending inwardly. This is established by means of a counter matrix or counter electrode moving within the sliding block.

The invention is further related to a machine for carrying out the present method.

The invention relates also to a plastic bag manufactured in accordance with the present method.

Moreover the invention relates to a plastic bag provided with one or more connecting nipples welded in the folding line, which is thus in the middle of the bottom of the bag.

The invention will be more fully explained with reference to the figures in the enclosed drawings.

FIG. 1 is a schematic plan view illustrating the prior art method;

FIG. 2 is an elevational view illustrating the product obtained with the prior art method;

FIG. 3 is a schematic plan view illustrating the method according to the present invention;

FIG. 4 is an elevational view illustrating the product obtained with the present method;

FIG. 5 is a schematic side elevational view illustraring the mechanism for slidingly conveying the plastic material with respect to the sliding block;

FIG. 6 is a fragmentary schematic side elevational view illustrating the mechanism shown in FIG. 5;

FIG. 7 is a partially schematic fragmentary elevational view illustrating a plunger or core pin being mechanically movable in the core;

FIG. 8 is a fragmentary sectional elevational view on a larger scale, illustrating a detail of a specially shaped needle tip of a plunger movable within the core;

FIG. 9 is a schematic, exploded view, partially in perspective, illustrating a plurality of piston-cylinder-systems for the simultaneous operation of a plurality of plungers or core pins;

Figure 14:
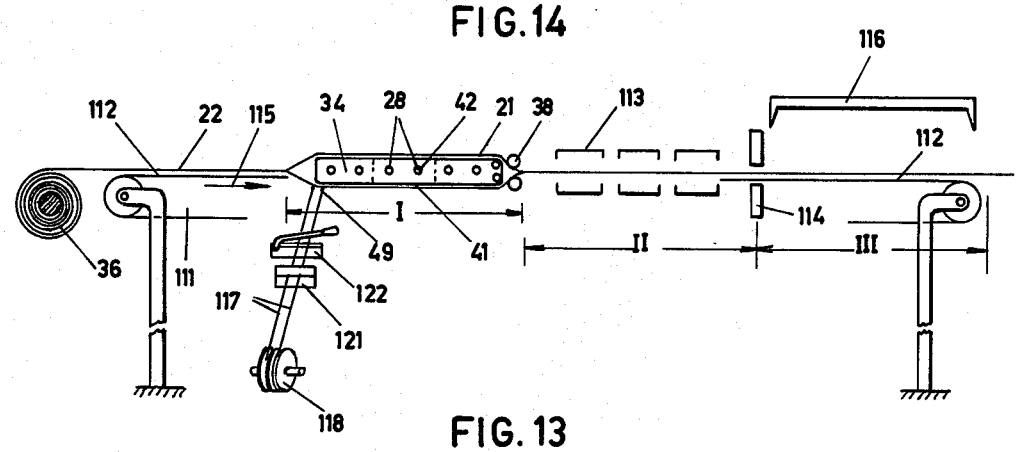
Figure 13:
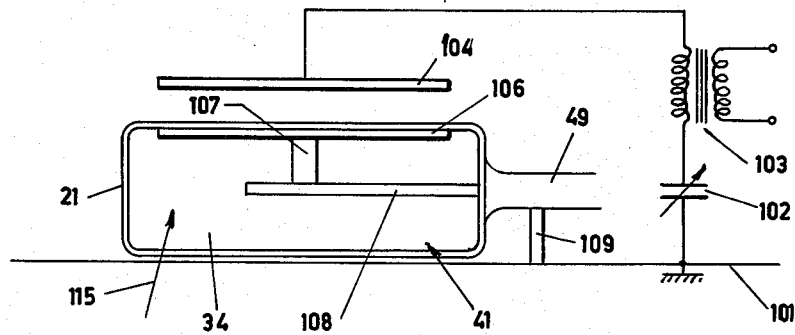

FIG. 13 schematically illustrates the manner in which the core forms part of the switching circuit of a high frequency welding apparatus; and FIG. 14 is a side elevational view schematically illustrating a complete embodiment of a machine according to the present invention, in which various phases of the present method are represented.

In FIG. 1, a known method for the manufacture of plastic bags 1 is illustrated. The bags are manufactured from a continuous, flat folded extruded plastic tube 2 that moves in the direction shown by arrow 3. The tube is cut along cutting lines 4, whereby each bag 1 is provided at one side or upper end with a sealing weld 6 (FIG. 2). The bag is then still open at one end, viz. the opposite or bottom end 7. From the end 7 a core or core pins are inserted prior to welding-on connecting nipples 8 (FIG. 2) at some distance above the bottom end 7. Next, the core is pulled out of the bag 1 and the lower end 7 is provided with a sealing weld 9 and end weld 11. At the same time the upper side or end 6 is provided with a sealing weld 12. In the sealing weld 12 at the upper end 6 an opening 13 is provided so that the bag 1 can be suspended.

In FIG. 3 the principle of the method according to the present invention is illustrated. According to the present invention, bags 21 are not taken out of the length but out of the width of a flat tube 22. An example of the finished bag 21 is shown in FIG. 4. The upper and lower end welds 24 and 26 respectively are now arranged in the side folds of the tube 22 so that sealing welds can be disposed of. These are now provided transversely to the direction of movement shown by arrow 23 of the tube 22 as side sealing welds 29 and 31. In the end weld 24 of the upper side fold is also provided an opening 33. The connecting nipples 28 are completely arranged in the bottom end 27.

The foregoing construction of the bags 21 can be accomplished with a sliding block 34 in the interior of the flat tube 22, as shown in FIG. 5. It is shown in FIG. 5 that the tube 22 is wound from a coil 36 and the portion of the tube opened by the sliding block 34 is limited by upstream and downstream roller mechanisms 37 and 38 respectively. The roller mechanisms 37 and 38 are stationary (although rotatable) and cause the tube 22 to be pulled over the sliding block 34.

Instead of rollers smooth sliders 38 could also be used for this purpose, as shown in FIG. 6. In the bottom side 41 of the sliding block 34 openings 42 are provided, through which the tips of the core pins can project.

In FIG. 7 a portion of a longitudinal section of a sliding block 34 is shown, in which holes 43 are provided coaxially with the openings 42. A plunger or core pin 44 terminating in a tip 46 which can project through the opening 42 is located in the holes 43. There is also provided, opposite the side of the pin 44, remote from the pin tip 46, a piston-cylinder-system 47 that is arranged outside the bag 21, the system 47 being located in such a position that the piston stem 48 is already in contact with the plunger 44 to thereby locally depress slightly the material of the bag 21.

In front of the pin tip 46 there is a connecting nipple 28 which is to be welded-on to the bottom end 27 of the bag 21. The nipple 28 is located in an opening in a die 49 with the surface of the die 49 that is adjacently opposite the pin tip 46 being generously rounded as designated by the reference character 51, whereby the material of the bag 2 and that of the nipple 28 fuse smoothly into each other during the welding process. During this operation the bottom end 27 of the bag 21 is pinched through by the pin tip 46 in the vicinity of the nipple 28 so that this material also fuses with the weld being formed.

In FIG. 8 is shown, on a slightly larger scale, a more complete die 49 and also a detail of the pin tip 46 which is also provided with a generously rounded shoulder that cooperates with the rounded portion 51 in order to facilitate the fusing into each other of the materials to be welded together. The die 49 is formed by a metal top plate 52 and a metal bottom plate 53, between which insulating material 54 is provided. The plates 52 and 53 are connected mechanically and, also in a high frequency welding current conductive way by bolts 56.

In FIG. 9 there is schematically shown the manner in which a number of piston-cylinder-systems 47 can be simultaneously operated, when the sliding block 34 extends over a length of four bags.

Figure 10:
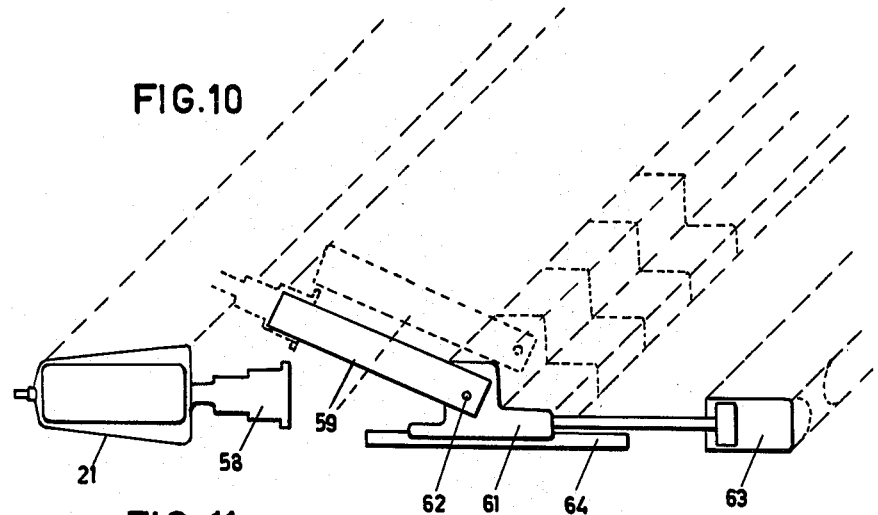
FIG. 10 is an exploded, perspective view schematically illustrating another nipple embodiment, which is not taken from a continuous string, but which has the possibility of being brought, by means of a swinging mechanism, to the bottom of the bags.

In FIG. 10 is shown a specially formed nipple 58 being welded to a bag 21. It will be evident that this particular form does not offer any problem in the present method and that virtually each form can be welded with the method of this invention. The form deviating from a smooth nipple, such as nipple 28, provides that this nipple cannot be cut from a continuous hose, but rather each such nipple should be manufactured separately. Putting these nipples 58 near the bottom 27 of the bag 21 is, however, effected completely automatically by means of a swinging mechanism. The nipples 58 are slid on a hinged pin 59 that is fixed on a slide 61. By swinging around an axis 62, the nipple 58 is brought to the desired position. Thereafter, the slide 61 is withdrawn by means of a piston-cylinder-system 63 with the slide 61 moving along rails 64. By means of dotted lines in FIG. 10, it is made clear that this construction is also suitable to simultaneously operate a number of pins 59 about axis 62.

Figure 11:
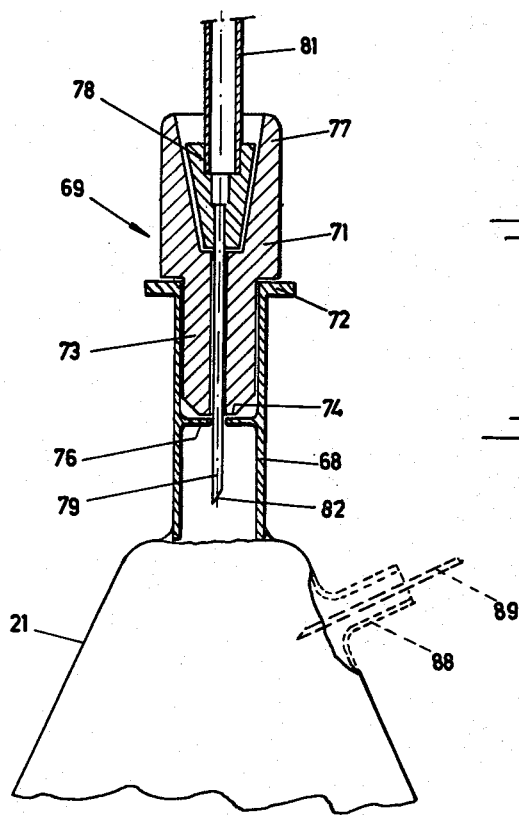
FIG. 11 is a fragmentary, sectional elevational view, illustrating a practical application of a bag equipped with the nipple according to FIG. 10 in the mounting of a droplet-counter.

FIG. 11 shows the application of a flanged nipple 68 for the mounting of a droplet-counter 69. For this purpose an adaptor 71 is inserted into the nipple 68 and the droplet-counter 69 comes to rest on a flange 72 and is supported with the plunger-like lower part 73 of the droplet-counter 69 in the nipple 68. The lower face 74 of the plunger 73 extends to a position near and in opposition to a membrane 76 present in the nipple 68. The upper part 77 of the adaptor 71 a tapered plug-like member 78 with a droplet needle 79 and a feed tube 81 are arranged whereby the sharp point 82 of the droplet needle 79 pierces through the membrane 76. By means of dotted lines in FIG. 11 a prior construction of a nipple is indicated, whereby the injection needle 89 was not guided and supported during the piercing of the wall so that it can easily pierce through a spot of the wall of the bag 21, situated beyond the nipple 88 causing damage to the bag 21.

Figure 12:
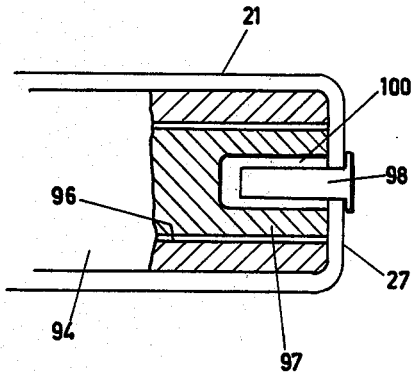
FIG. 12 is a fragmentary side elevational view, partially in section, illustrating a counter-matrix displaceable within the core for welding-on a nipple projecting into the interior of the bag.

In FIG. 12 a sliding block 94 is shown, whereby in a bote 96 thereof a displaceable counter-matrix 97 is placed to supply counter pressure during welding of a flanged nipple 98 to the inner side of the bottom end 27 of the plastic bag 21. The nipple 98 extends into the interior through an opening in the bottom end 27. The bore 96 is fored as a groove so that, during periodic displacement, the sliding block 94 can slide with respect to the bag 21.

FIG. 13 shows an electric welding schematic that a variable capacitor 102, a high frequency transformer 103, a first capacitor 104, a second capacitor plate 106, between which plates, through the plastic material of the bag 21, a capacitive coupling exists. The second capacitor plate 106 lies on and contacts the sliding block 34 and is coupled by means of metallic conductors 107 and 108, capacitively through the material of the bag 21, with the die 49 for the welding on a connecting nipple. The die 49 is connected through a metallic conductor 109 with ground 101, and also with the capacitor 102, thus closing the circuit.

FIG. 14 schematically illustrates a complete machine for carrying out the method according to the present invention in which the various phases of the periodic, intermittent cycle are represented. A supply coil 36, disposed near the trailing end of a conveyor 111, continuously delivers a flat tube 22 onto the upper carrying surface 112 of an endless belt defining a conveyor 111. First the flat tube 22, which contains a sliding block 34 having a length sufficient for the simultaneous welding of a number of connecting nipples 28 (in the example shown, three bags), passes a first welding zone I, at the beginning and the end of which sliding rollers 37 and 38 are arranged. Rollers 37 are not shown in FIG. 14 for purposes of clarity but may be seen in FIG. 5. In zone I the connecting nipples 28 are welded into the bags 21, the long side face 41 functioning as a supporting face-counter electrode for welding the connecting nipples 28 in cooperation with an outer die 49. Next, the tube 22 passes a zone II where, by means of a welding unit 113 composed of three parts, the welds are made on the edges, etc. Finally, the tube 22 passes through a zone III, wherein there is located the periodic driving mechanism in the form of clamping beams 114. In zone III there is also provided a hot punching device 116 for cutting and severing the individual bags from the plastic webs. Since therewith the integrity of the original tube is lost, the clamping beams 114 must be positioned before the not punching device 116. At the beginning of the production, when the leading end of the flat tube 22 has been decoiled sufficiently that it arrives at the first welding zone I, the sliding block 34 is first inserted into the tube 22 and the rollers 37 and 38 or the means 39 are placed in their position s shown in FIGS. 5 and 14. Then the tube 22 is advanced over the stationary sliding block 34 until the leading end of the tube 22 enters into the welding zone II. There the leading end is sealed-off, permitting subsequent work to be carried out under entirely non-pyrogenous conditions. The tube 22 is advanced farther until it is engaged by the clamping beams 114. Thereafter the production proper starts.

Sideways of the conveyor 111 in the welding zone I the continuous supply of connecting nipples takes place from a striplike narrow hose 117 which is wound o a supply coil 118. The hose 117 is periodically advanced by clamps 121 that are coupled via a transmission means (not-shown) with the actuation device of the clamping means 114. When the leading end of the hose 117 is inserted by means of the clamps 121 into the outer die 49, the hose 117 is cut through by means of a cutting means 122 and at the same time the trailing of the hose piece just cut is sealed off. Thus, a non-pyrogenous supply of the hose lengths is guaranteed. These two operations can be conducted by a combined welding-cutting device. The hose length thus cut is welded as a connecting nipple 28 during the stand-still (laydown) period of the intermittent movement of the bottom of the various bags 21 (for example, two nipples per bag), with the bottom of the bags 21 facing the supporting face 41 of the sliding block 34. In this way a non-pyrogenous adhesion of the connecting nipples 28 to the bags 21 is obtained.

What I claim is:

1. A machine for manufacturing continuous and non-pyrogenous plastic bags provided with connection nipples, said machine comprising coil means for supplying two superimposed webs of plastic material, a conveyor, a driving mechanism for intermittently advancing said conveyor with the plastic webs and a welding-cutting unit, provided with a sliding block, said sliding block having the shape of a rectangular parallepiped, wherein one of the two long side faces of said parallelopiped serving as a supporting face and a counter electrode for welding on one or more connecting nipples in cooperation with an outer die opposite said one said face and wherein, for simultaneous welding of a plurality of separately manufactured connection nipples, said side face of said sliding block serves as a supporting face and a counter electrode, there being further included a plurality of swinging devices positioned in opposition to said side face, said swinging devices being mounted on slides and piston means for driving said slides.

2. A machine as claimed in claim 1 in which said side face of said sliding block serving as the supporting face is provided with at least one opening and a hollow space, there being further included a movable plunger slidably received in said hollow space within said block, said plunger having a sharp tip adapted to penetrate that part of the bag wall where the connecting nipple has been seucred.

3. A machine as claimed in claim 2 further comprising a counter matrix slidable within said hollow space of said block, said counter matrix being provided with a continuous longitudinal groove for welding on the connecting nipple having a flange or a collar on the outer side of the bag wall, the hose end of which projects into the interior.

4. A machine as claimed in claim 1 wherein said sliding block, when viewed in the direction of conveyance, is also provided at its leading end and its trailing end with rollers.

5. A machine as claimed in claim 1 wherein said sliding block, when viewed in the direction of conveyance, is also provided at its leading end and its trailing end with a coating of low coefficient of friction material.

6. A machine according to claim 1 wherein said sliding block is inserted during the operation of said machine between the two plastic webs and operates as a counter electrode for non-pyrogenous welding of the connecting nipples onto one or more bags in cooperation with die means provided in a first welding zone, there being further included means for retaining said sliding block in its position within said first welding zone during the intermittent transport of the plastic webs.

7. A machine according to claim 6 in which said retaining means are formed as smooth sliding pieces arranged at the beginning and at the end of said first welding zone.

8. A machine according to claim 6 wherein there is at least one coil means provided with a cutting device and a driving means that is synchronized with said driving mechanism of said conveyor for intermittently supplying hose pieces of any length to said die means in said first welding zone, said hose pieces serving as the connecting nipples.

9. A machine according to claim 1 in which for piercing the bag wall when a connecting nipple is secured, at least one transverse bore is formed within said sliding block, there being further included a plunger located in said bore with said plunger terminating in a sharp-pointed pin and a piston-cylinder-system opposite the other long side face of said sliding block for actuating said pin.

10. A machine for manufacturing continuous and non-pyrogenous plastic bags provided with connection nipples, said machine comprising coil means for supplying two superimposed webs of plastic material, a conveyor, a driving mechanism for intermittently advancing said conveyor with said plastic webs, a welding-cutting unit provided with a sliding block, said sliding block being inserted during the operation of said machine between the two plastic webs and operating as a counter electrode for the non-pyrogenous welding of the connecting nipples onto one or more bags in cooperation with die means provided in a first welding zone and means for retaining said sliding block in its position within said first welding zone during the intermittent transport of the plastic webs, said retaining means being formed as smooth sliding pieces arranged at the beginning and at the end of said first welding zone.

11. A machine according to claim 10 wherein there is at least one coil means provided with a cutting device and a driving means that is synchronized with said driving mechanism of said conveyor for intermittently supplying hose pieces of any length to said die means in said first welding zone, said hose pieces serving as the connecting nipples.

12. A machine as claimed in claim 10 wherein the sliding block has the shape of a rectangular parallepiped and wherein one of the two long side faces thereof serves as a supporting face and counter electrode for welding on one or more connecting nipples in cooperation with an outer die opposite said one said face.

13. A machine as claimed in claim 12 in which said side face of said sliding block serving as the supporting face is provided with a least one opening and a hollow space, there being further included a movable plunger slidably received in said hollow space within said block, said plunger having a sharp tip adapted to penetrate that part of the bag wall where the connecting nipple has been secured.

14. A machine as claimed in claim 13 further comprising a counter matrix slidable within said hollow space of said block, said counter matrix being provided with a continuous longitudinal groove for welding on the connecting nipple having a flange or a collar on the outer side of the bag wall, the hose end of which projects into the interior.

15. A machine as claimed in claim 12 wherein said sliding block, when viewed in the direction of conveyance, is also provided at its leading end and its triling end with rollers.

16. A machine as claimed in claim 12 wherein said sliding block, when viewed in the direction of conveyance, is also provided at its leading end and its trailing end with a coating of low coefficient of friction material.

17. A machine according to claim 10 wherein, for the simultaneous welding of a plurality of separately manufactured connection nipples, said side face of said sliding block serves as a supporting face and a counter electrode, a plurality of swinging devices being positioned in opposition to said side face, said swinging devices being mounted on slides and piston means for driving said slides.

18. A machine according to claim 12 in which for piercing the bag wall when a connecting nipple is secured, at least one transverse bore is formed within said sliding block, a plunger being located in said bore with said plunger terminating in a sharp-pointed pin and a piston-cylinder-system opposite the other long side face of said sliding block for actuating said pin.

19. A machine for manufacturing continuous and non-pyrogenous plastic bags provided with connection nipples said machine comprising coil means for supplying two superimposed webs of plastic material, a conveyor, a driving mechanism for intermittently advancing said conveyor with the plastic webs and a welding-cutting unit, provided with a sliding block, said sliding block having the shape of a rectangular parallelpiped and wherein one of the two long side faces thereof serves as a supporting face and counter electrode for welding on one or more connecting nipples in cooperation with an outer die opposite said one said face, said side face of said sliding block serving as the supporting face being provided with at least one opening and a hollow space, and a movable plunger slidably received in said hollow space within said block, said plunger having a sharp tip adapted to penetrate that part of the bag wall where the connecting nipple has been secured.

20. A machine as claimed in claim 19 wherein said sliding block, when viewed in the direction of conveyance, is also provided at its leading end and its trailing end with rollers.

21. A machine as claimed in claim 19 wherein said sliding block, when viewed in the direction of conveyance, is also provided at its leading end and its trailing end with a coating of low coefficient of friction material.

22. A machine according to claim 19 wherein said sliding block is inserted during the operation of said machine between the two plastic webs and operates as a counter electrode for the non-pyrogenous welding of the connecting nipples onto one or more bags in cooperation with die means provided in a first welding zone and further including means for retaining said sliding block in its position within said first welding zone during the intermittent transport of the plastic webs.

23. A machine according to claim 22 in which said retaining means are formed as smooth sliding pieces arranged at the beginning and at the end of said first welding zone.

24. A machine according to claim 22 wherein there is at least one coil means provided with a cutting device and a driving means that is synchronized with said driving mechanism of said conveyor for intermittently supplying hose pieces of any length to said die means in said first welding zone, said hose pieces serving as the connecting nipples.

25. A machine according to claim 19 wherein, for the simultaneous welding of a plurality of separately manufactured connection nipples said side face of said sliding block serves as a supporting face and a counter electrode, there being further included a plurality of swinging devices positioned in opposition to said side face, said swinging devices being mounted on slides and piston means for driving said slides.

26. A maching according to claim 19 in which for piercing the bag wall when a connecting nipple is secured at least one transverse bore is formed within said sliding block, there being further included a plunger located in said bore with said plunger terminating in a sharp-pointed pin and a piston-cylinder-system opposite the other long side face of said sliding block for actuating said pin.

27. A machine as claimed in claim 19 further comprising a counter matrix slidable within said hollow space of said block, said counter matrix being provided with a continuous longitudinal groove for welding on the connecting nipple having a flange or a collar on the outer side of the bag wall, the hose end of which projecting into the interior.

28. A sliding block for use in the manufacture of continuous and non-pyrogenous plastic bags provided with connection nipples wherein the sliding block has the shape of a rectangular parallepiped and wherein one of the two long side faces thereof serves as a supporting face and counter electrode for welding on one or more connecting nipples in cooperation with an outer die opposite said one said face, said sliding block, when viewed in the direction of conveyance, also being provided at its leading end and its trailing end with a coating of low coefficient friction material.

29. A sliding block according to claim 28 further comprising a counter matrix slidable within said hollow space of said block, said counter matrix being provided with a continuous longitudinal groove for welding on the connecting nipple having a flange or a collar on the outer side of the bag wall, the hose end of which projects into the interior.

30. A sliding block according to claim 28 in which said side face of said sliding block serving as the supporting face is provided with at least one opening and a hollow space, and a movable plunger slidably received in said hollow space within said block, said plunger having a sharp tip adapted to penetrate that part of the bag wall where the connecting nipple has been secured.

31. A sliding block for use in the manufacture of continuous and non-pyrogenous plastic bags provided with connection nipples wherein the sliding block has the shape of a rectangular parallepiped and wherein one of the two long side faces thereof serves as a supporting face and counter electrode for welding on one or more connecting nipples in cooperation with an outer die opposite said one said face, said side face of said sliding block serving as the supporting face being provided with at least one opening and a hollow space, there being further included a movable plunger slidably received in said hollow space within said block, said plunger having a sharp tip adapted to penetrate that part of the bag wall where the connecting nipple has been secured.

32. A sliding block according to claim 31 further comprising a counter matrix slidable within said hollow space of said block, said counter matrix being provided with a continuous longitudinal groove for welding on the connecting nipple having a flange or a collar on the outer side of the bag wall, the hose end of which projecting into the interior.

33. A sliding block according to claim 31 wherein said sliding block, when viewed in the direction of conveyance, is also provided at its leading end and its trailing end with rollers.

34. A sliding block according to claim 31 wherein said sliding block, when viewed in the direction of conveyance, is also provided at its leading end and its trailing end with a coating of low coefficient of friction material.

* * * * *